(12) United States Patent
Yiu et al.

(10) Patent No.: US 8,818,376 B2
(45) Date of Patent: Aug. 26, 2014

(54) USER EQUIPMENT AND METHOD FOR ADAPTIVE SELECTION OF HANDOVER PARAMETERS IN WIRELESS-ACCESS NETWORKS

(75) Inventors: Candy Yiu, Portland, OR (US); Mo-Han Fong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 13/569,443

(22) Filed: Aug. 8, 2012

(65) Prior Publication Data

US 2013/0196664 A1 Aug. 1, 2013

Related U.S. Application Data

(60) Provisional application No. 61/591,641, filed on Jan. 27, 2012.

(51) Int. Cl.
*H04W 36/00* (2009.01)
(52) U.S. Cl.
USPC .......................................... 455/436; 455/437
(58) Field of Classification Search
CPC . H04W 36/0083; H04W 36/34; H04W 36/36; H04W 36/00
USPC ............................ 455/436–444; 370/331–334
See application file for complete search history.

(56) References Cited

U.S. PATENT DOCUMENTS

| 8,331,936 | B2 * | 12/2012 | Alonso-Rubio et al. | 455/436 |
|---|---|---|---|---|
| 2010/0197300 | A1 * | 8/2010 | Van Der Velde et al. | 455/425 |
| 2010/0273487 | A1 * | 10/2010 | Alonso-Rubio et al. | 455/436 |
| 2011/0002307 | A1 * | 1/2011 | Muller et al. | 370/332 |
| 2011/0092210 | A1 * | 4/2011 | Kumar et al. | 455/436 |
| 2012/0238272 | A1 * | 9/2012 | Hwang et al. | 455/436 |
| 2012/0300657 | A1 * | 11/2012 | Jung et al. | 370/252 |
| 2013/0023302 | A1 * | 1/2013 | Sivanesan et al. | 455/525 |
| 2013/0079048 | A1 * | 3/2013 | Cai et al. | 455/517 |
| 2013/0109389 | A1 * | 5/2013 | Olofsson et al. | 455/436 |
| 2013/0137435 | A1 * | 5/2013 | Shi | 455/436 |
| 2013/0150053 | A1 * | 6/2013 | Hwang et al. | 455/440 |
| 2013/0189996 | A1 * | 7/2013 | Sridhar et al. | 455/444 |

FOREIGN PATENT DOCUMENTS

| EP | 1139689 A2 | 8/2012 |
|---|---|---|
| WO | WO-2013112716 A1 | 8/2013 |

OTHER PUBLICATIONS

"International Application Serial No. PCT/US2013/022944, International Search Report mailed Mar. 28, 2013".
"International Application Serial No. PCT/US20131022944, Written Opinion mailed Mar. 28, 2013".
Li, V. O. K., et al., "Personal communication systems (PCS)", Proceedings of the IEEE, 33(9), See Abstract, p. 1225 Right col., line 46—p. 1232, right col., line 11; figs 18-22; table 4, (1995), 1210-1243.

* cited by examiner

*Primary Examiner* — Nathan Mitchell
(74) *Attorney, Agent, or Firm* — Schwegman Lundberg & Woessner, P.A.

(57) ABSTRACT

Embodiments of user equipment (UE) and method for adaptively selecting an A3offset-TTT pair for handover in a wireless access network are generally described herein. In some embodiments, the UE may select an A3offset value based on target cell Reference Signal Received Power (RSRP) and select a time-to-trigger (TTT) based on serving cell RSRP. A measurement report may be transmitted to an eNodeB for handover when the target cell RSRP exceeds the serving cell RSRP by at least the A3offset value for the TTT. The A3offset value may be selected to be inversely related to the target cell RSRP and the TTT may be selected to be directly related to the serving cell RSRP.

19 Claims, 2 Drawing Sheets

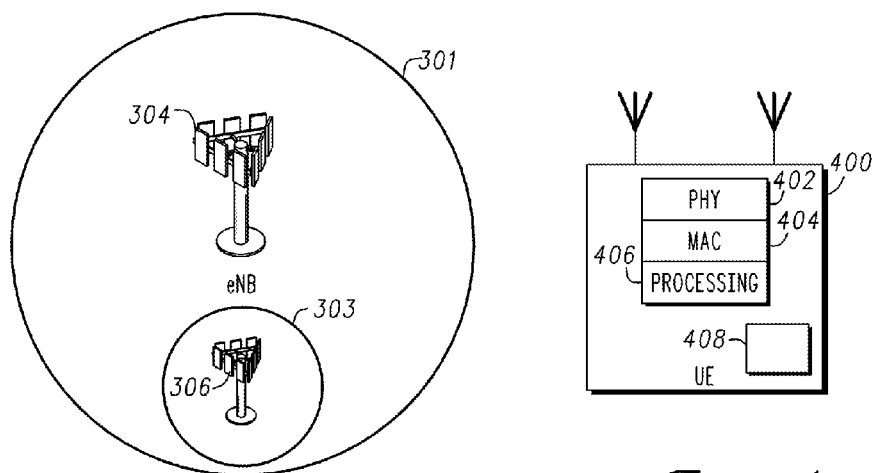
Fig. 3
Fig. 4
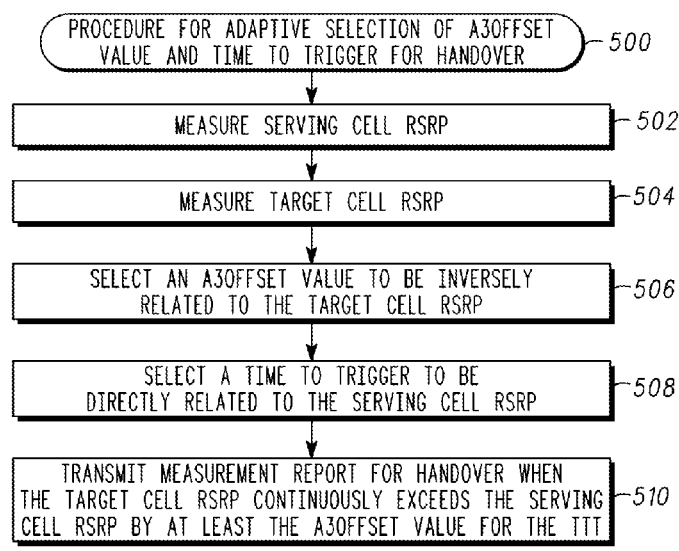
Fig. 5

USER EQUIPMENT AND METHOD FOR ADAPTIVE SELECTION OF HANDOVER PARAMETERS IN WIRELESS-ACCESS NETWORKS

PRIORITY APPLICATION

This application claims the priority benefit under 35 U.S.C §119(e) of U.S. Provisional Application Ser. No. 61/591,641, filed Jan. 27, 2012, which is incorporated herein by reference.

TECHNICAL FIELD

Embodiments pertain to wireless cellular communications. Some embodiments relate to HetNet mobility. Some embodiments relate to handover between cells including handover between cells of different cell layers.

BACKGROUND

One issue with cellular communication networks is determining when a mobile device should be handed over between cells (i.e., from a serving cell to a target cell). One of the challenges is performing a handover before the radio link fails. This is particularly an issue in heterogeneous networks (HetNets) where small cells are overlaid by larger cells. Higher mobility devices have made these handover challenges increasingly difficult. Some conventional techniques use the velocity of a mobile device to reduce the radio link failure rate; however, this increases overhead and processing.

Thus there are general needs for improved handover techniques that reduce the radio-link failure rate. There are also general needs for improved handover techniques that reduce the radio-link failure rate, increase handover efficiency and operate with less overhead. There are also general needs for improved handover techniques that do not require the use of the velocity of a mobile device. There are also general needs for improved handover techniques that reduce the radio-link failure rate, particularly for fast moving mobile devices. There are also general needs for improved handover techniques suitable for HetNet mobility.

BRIEF DESCRIPTION OF THE DRAWINGS

FIG. 3 illustrates cellular communications within different cell layers in accordance with some embodiments;

FIG. 4 is a block diagram of user equipment (UE) in accordance with some embodiments; and FIG. 5 is a procedure for adaptive selection of handover initiation parameters in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
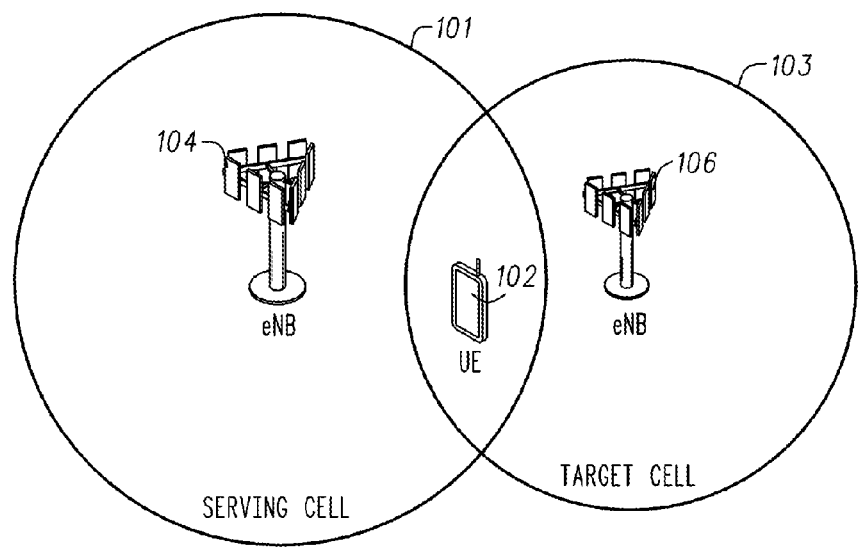
FIG. 1 illustrates cellular communications in accordance with some embodiments.

FIG. 1 illustrates cellular communications in accordance with some embodiments. A base station, such as enhanced or evolved node B (eNodeB) 104, provides wireless communication services to communication devices, such as UE 102, within cell 101. A base station, such as eNodeB 106, provides wireless communication services to communication devices within cell 103. A handover may be performed from eNodeB 104 to eNodeB 106 to handover communications with the UE 102 when certain handover criterion are met.

In accordance with embodiments, handover initiation parameters, such as an offset value and a time-to-trigger (TTT), may be adaptively selected for performing a handover from a serving cell, such as cell 101, to a target cell, such as cell 103. In these embodiments, the offset value and the TTT may be selected based on received power levels of certain signals such as reference signals. In some embodiments, reference signal received power (RSRP) may be used.

In some embodiments, the offset value may be an A3offset value. In some of these embodiments, the A3offset value may be selected based on one or more of a target cell reference signal received power (tarRSRP) and a source or serving cell RSRP (srcRSRP). The TTT may be selected based on the one or more of the target cell RSRP and the serving cell RSRP. In some of these embodiments, an A3offset value may be selected based on a target cell RSRP, and a TTT may be selected based on serving cell RSRP.

In these embodiments, a handover from the serving cell 101 to the target cell 103 may be initiated when the target cell RSRP continuously exceeds the serving cell RSRP by at least the selected A3offset value for the selected TTT. In some embodiments, the A3offset value may be selected to be inversely related to the target cell RSRP, and the TTT may be selected to be directly related to the serving cell RSRP. These embodiments are described in more detail below.

Figure 2:
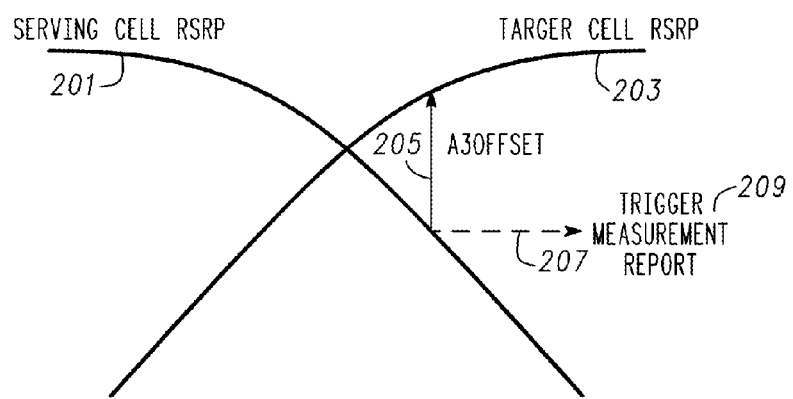
FIG. 2 illustrates an example of handover initiation criterion in accordance with some embodiments.

FIG. 2 illustrates an example of handover initiation criterion in accordance with some embodiments. Serving cell 101 (FIG. 1) may have a serving cell RSRP 201, and target cell 103 (FIG. 1) may have a target cell RSRP 203. In this example illustration, the serving cell RSRP 201 and the target cell RSRP 203 may vary as illustrated, which may be the case as a UE, such as UE 102 (FIG. 1), moves within the serving cell 101 with respect to the target cell 103. As illustrated in FIG. 2, when the target cell RSRP 203 continuously exceeds the serving cell RSRP 201 by at least the A3offset value 205 (i.e., an A3event) for the TTT 207, a handover may be initiated. In some embodiments, the UE 102 may transmit a measurement report 209 for handover from the serving cell 101 to the target cell 103 to initiate handover.

An A3event, as used herein, may be a measurement reporting event when a neighbor cell's RSRP becomes an amount of offset (i.e., an A3offset value) better than the RSRP of the primary cell (PCell) (e.g., the serving cell RSRP). In some embodiments, an A3event may refer to an 'Event A3' in accordance with 3GPP T.S. 36.331 (3rd Generation Partnership Project; Technical Specification Group Radio Access Network; Evolved Universal Terrestrial Radio Access (E-UTRA); Radio Resource Control (RRC); Protocol specification (Release 11)) although this is not a requirement. In these embodiments, the Event A3 is a handover event and the A3offset is a value for triggering handover.

In these embodiments, the selected A3offset value 205 may be inversely related to the target cell RSRP 203, and the selected TTT 207 may be directly related to the serving cell RSRP 201. In these embodiments, the adaptive selection of the A3offset value 205 and the TTT 207 (i.e., an A3offset-TTT pair) may improve handover efficiency, reduce radio-link failure (RLF) and reduce handover overhead, particularly for UEs that are moving, including those that are moving fast. The adaptive selection of an A3offset-TTT pair based on RSRPs may improve handover efficiency and reduce radio-link failure particularly for fast moving UEs without needing to estimate or use the speed of a UE.

In some embodiments, a set of A3offset values and TTTs along with one or more thresholds may be sent by the eNodeB 104 to the UE 102 at radio-resource control (RRC) connection establishment (e.g., at the initial connection establishment). When the UE 102 enters an A3event (i.e., the A3offset condition holds), the UE 102 may lock in the selected A3offset value-TTT pair until the TTT time. After expiration of the A3event, the UE 102 may unlock the selected A3offset value-TTT pair when the UE 102 exits the A3event. In these embodiments, when outside of an A3event, the UE 102 may monitor the serving cell RSRP 201 and the target cell RSRP 203 and dynamically select an A3offset value-TTT pair based on the one or more RSRP thresholds.

In some embodiments, the UE 102 may refrain from selecting or reselecting an A3offset value 205 and TTT 207 during an A3event. The A3event may include a time when a measured target cell RSRP 203 exceeds a measured serving cell RSRP 201 by a currently selected A3offset value 205. The selection and reselection of an A3offset value 205 and TTT 207 of an A3offset-TTT pair may be performed on a regular basis outside of an A3event, and the selected A3offset value 205 and the TTT 207 are held (i.e., not reselected) during an A3event.

In some embodiments, selecting an A3offset value 205 may comprise selecting one of a plurality of A3offset values (i.e., v1, v2 or v3) based on the target cell RSRP 203. Selecting a TTT 207 may comprise selecting one of a plurality of TTTs (t1, t2 or t3) based on the serving cell RSRP 201. In these embodiments, a greater A3offset value 205 may be selected for a lower target cell RSRP 203, and a lesser A3offset value 205 may be selected for a higher target cell RSRP 203. In these embodiments, the selected A3offset value 205 is inversely proportional to or related to the target cell RSRP 203. The A3offset value 205 may be in dB although the scope of the embodiments is not limited in this respect.

In some embodiments, the difference between the target cell RSRP 203 and serving cell RSRP 201 (e.g., the measured serving cell RSRP 201 subtracted from the measured target cell RSRP 203) may be referred to as a measured A3offset. An A3event may occur when the measured A3offset exceeds to the selected A3offset value 205.

In some embodiments, a greater TTT 207 may be selected for a higher serving cell RSRP 201 and a lesser TTT 207 may be selected for a lower serving cell RSRP 201. In these embodiments, the selected TTT 207 may be directly related or linearly proportional to the serving cell RSRP 201. The TTT 207 may be in milliseconds although the scope of the embodiments is not limited in this respect.

In some embodiments, the plurality of A3offset values and the plurality of TTTs may be received from the eNodeB 104 at an RRC connection establishment. In some embodiments, the plurality of A3offset values and the plurality of TTTs may be based on a default or initial A3offset value and TTT. In some embodiments, the A3offset values and the TTTs may be configured or determined by the eNodeB 104 at the RRC connection establishment between the eNodeB 104 and the UE 102, although this is not a requirement. In some embodiments, the A3offset values and the TTTs may be predetermined. The A3offset values and the TTTs may be stored in the UE 102 for later selection as described above.

In some alternate embodiments, the plurality of A3offset values and the plurality of TTTs may be generated by the UE 102 based on a default or initial A3offset value and TTT. In these alternate embodiments, the default or initial A3offset value and TTT may be provided by the eNodeB 104, although this is not a requirement.

In some embodiments, a first A3offset value (v1) may be selected for the A3offset value 205 when the target cell RSRP 203 is greater than a RSRP threshold ($\alpha$), and a second A3offset value (v2) may be selected for the A3offset value 205 when the target cell RSRP 203 is not greater than the RSRP threshold ($\alpha$). In these embodiments, a first TTT (t1) may be selected for the TTT 207 when the serving cell RSRP 201 is greater than the RSRP threshold ($\alpha$), and a second TTT (t2) may be selected for the TTT 207 when the serving cell RSRP 201 is not greater than the RSRP threshold ($\alpha$). The first A3offset value (v1) may be less than the second A3offset value (v2), and the first TTT (t1) may be greater than the second TTT (t2). In some of these embodiments, the first A3offset value (v1), the second A3offset value (v2), the first TTT (t1), the second TTT (t2) and the RSRP threshold ($\alpha$) may be provided by the eNodeB 104 at a connection establishment.

In some embodiments, the target cell RSRP 203 and the serving cell RSRP 201 may be divided into a plurality of levels (N) in which N−1 RSRP thresholds are used to select from N A3offset values and N TTTs. In an example embodiment in which three levels are used (N=3), a first A3offset value (v1) may be selected for the A3offset value 205 when the target cell RSRP 203 is greater than a first RSRP threshold ($\alpha$); a second A3offset value (v2) may be selected for the A3offset value 205 when the target cell RSRP 203 is greater than a second RSRP threshold ($\beta$) but is not greater than the first RSRP threshold ($\alpha$); and a third A3offset value (v3) may be selected for the A3offset value 205 when the target cell RSRP 203 is not greater than the second RSRP threshold ($\beta$). A first TTT (t1) may be selected for the TTT 207 when the serving cell RSRP 201 is greater than the RSRP threshold ($\alpha$); a second TTT (t2) may be selected for the TTT 207 when the serving cell RSRP 201 is greater than a second RSRP threshold ($\beta$) but is not greater than the first RSRP threshold ($\alpha$); and a third TTT (t3) may be selected for the TTT 207 when the serving cell RSRP 201 is not greater than the second RSRP threshold ($\beta$). The first A3offset value (v1) may be less than the second A3offset value (v2), which may be less than the third A3offset value (v3) (i.e., $v1<v2<v3$). The first TTT (t1) may be greater than the second TTT (t2), which may be greater than the third TTT (t3) (i.e., $t1>t2>t3$). In these embodiments, the first, second and third A3offset values, the first, second and third TTTs, and the first and second RSRP thresholds may be provided by the eNodeB 104 at a connection establishment.

In these embodiments, the first RSRP threshold ($\alpha$) may be greater than the second RSRP threshold ($\beta$) by up to three dB or more, although the scope of the embodiments is not limited in this respect. In some embodiments, N may be greater or equal to two and less than five although the scope of the embodiments is not limited in this respect as N may be greater than five. In some embodiments, the RSRP threshold(s) ($\alpha$, $\beta$) may be determined by the system based on simulations performed for a UE moving at different speeds to minimize or reduce radio link failure and reduce handover overhead.

In an example embodiment for N=2, a single RSRP threshold and two different A3offset values and two different TTTs may be provided by the eNodeB 104. For N=3, two RSRP thresholds, three different A3offset values and three different TTTs may be provided. For N=4, three RSRP thresholds, four different A3offset value and four different TTTs may be provided. In these embodiments, the UE 102 may select an A3offset-TTT pair based on measured target and service cell RSRPs and the RSRP threshold(s) for handover initiation.

In some embodiments, the UE 102 may send or transmit a measurement report 209 to the serving eNodeB 104 when the target cell RSRP 203 has continuously exceeded the serving cell RSRP 201 by at least the selected A3offset value 205 for the selected TTT 207 for use by the eNodeB 104 of the serving cell 101 for potential handover decision. The measurement report 209 may include at least a cell identifier of the target cell 103. A handover may be performed in response to the measurement report 209.

In some embodiments, the measurement report 209 may include the serving cell RSRP 201 and the target cell RSRP 203 that was measured at expiration of the TTT timer. The measurement report 209 may also include the RSRP of other neighbor cells. In some embodiments, the measurement report 209 may be referred to as a trigger measurement report. In some of these embodiments, the neighbor cell with the greatest/strongest RSRP may be identified as the target cell 103. The measurement report 209 may identify a cell by its physical cell identifier (physcellid) and in some embodiments; a closed subscriber group (CSG) identity of the cell may be included. In some alternate embodiments, the measurement report 209 may be used to trigger a handover to the target cell and may not necessarily include RSRP values.

In some of these embodiments, when the serving eNodeB 104 decides to hand over the UE 102 to an eNodeB 106 of the target cell 103, the serving eNodeB 104 may send a handover request to the target eNodeB 106. The target eNodeB 106 may respond with a handover request acknowledgement (ACK). The serving eNodeB 104 may then notify the UE 102 with an RRC reconfiguration message that includes mobility control information (e.g., mobilityControlInfo) The serving eNodeB 104 may then transfer status to the target eNodeB 106 and the UE 102 may switch to the target eNodeB 106 with a RRC connection reconfiguration message to complete the handover process.

In some embodiments, the UE 102 may set a TTT timer when the target cell RSRP 203 exceeds the serving cell RSRP 201 by at least the selected A3offset value 205. The TTT timer may be configured to expire after the selected TTT 207. The UE 102 may stop the TTT timer when the target cell RSRP 203 does not exceed the serving cell RSRP 201 by at least the selected A3offset value 205. The TTT timer may be reset and restarted when the target cell RSRP 203 exceeds the serving cell RSRP 201 by at least the selected A3offset value 205. The UE 102 may send the measurement report 209 to the serving eNodeB 104 upon expiration of the TTT timer.

In some embodiments, the UE 102 may be configured to measure the RSRP of the target cell 103 and the RSRP of the serving cell 101 on a regular basis. The RSRP of the target cell 103 (i.e., target cell RSRP 203) may be based on an average of downlink reference signals transmitted by the target cell eNodeB 106 across a channel bandwidth. The RSRP of the serving cell 101 (i.e., serving cell RSRP 201) may be based on an average of downlink reference signals transmitted by the serving cell eNodeB 104 across the channel bandwidth. In these embodiments, RSRP may be a physical layer measurement performed by the UE 102 taking a linear average of the downlink reference signals across the channel bandwidth. The values may be generated after layer one (L1) and layer three (L3) filtering. In some embodiments, the RSRP measurements may be performed in accordance with one of the UTRAN LTE standards include the 3rd Generation Partnership Project (3GPP) standards for UTRAN-LTE 3GPP including TS 36.331, although this is not a requirement.

In some embodiments, the RSRP may be an average of the power of some or all resource elements which carry cell-specific reference signals over the entire bandwidth and is measured in orthogonal frequency division multiplexed (OFDM) symbols carrying the reference symbols. In these embodiments, reference signals transmitted by different eNodeBs may be distinguishable by their cell identifier, although this is not a requirement.

In the example illustrated in FIG. 1, the target cell 103 and the serving cell 101 may comprise the same cell layer. In these embodiments, the same cell layer may comprise either a macro-cell layer or a micro-cell layer.

In some other embodiments, the target cell 103 and the serving cell 101 may comprise different cell layers. The different cell layers may comprise a macro-cell layer and a micro-cell layer. The macro-cell layer may comprise macro cells. The micro-cell layer may comprise one or more of micro-cells, pico-cells and femto-cells. In some of these embodiments, cells of the micro-cell layer may be located within a cell of the macro layer, as illustrated in FIG. 3.

FIG. 3 illustrates cellular communications within different cell layers in accordance with some embodiments. In these example embodiments, eNodeB 304 may be a macro-eNodeB and may provide communication services with macro-cell 301 of a macro-cell layer. The eNodeB 306 may be a micro-cell eNodeB and may provide communication services within micro-cell 303 of a micro-cell layer. Micro-cell 303 may be located within macro-cell 301. In these embodiments, a UE may dynamically select an A3offset-TTT pair based on the serving cell RSRP and target cell RSRP and initiate handover based on the A3offset-TTT pair as discussed above. These embodiments may be particularly beneficial in heterogeneous networks (HetNet) (i.e., having different cell layers) including handovers between cells of the different sizes/layers.

FIG. 4 is a block diagram of user equipment (UE) 400 in accordance with some embodiments. UE 400 may be suitable for use as UE 102 (FIG. 1) although other configurations may also be suitable. The UE 400 may include physical-layer (PHY) layer circuitry 402 for communicating with an eNodeB through one or more antennas. The UE 400 may also include media-access control (MAC) layer circuitry 404 as well as processing circuitry 406 and memory 408.

In accordance with some embodiments, the processing circuitry 406 may be configured to select an A3offset value 205 (FIG. 2) and select a TTT 207 (FIG. 2) as discussed above. The physical layer circuitry 402 may be configured to measure the serving cell RSRP 201 and the RSRP of one or more neighbor cells including the RSRP of the target cell 103 (FIG. 1). Memory 408 may be configured to store the A3offset values, the TTTs and one or more RSRP thresholds that may have been received from the eNodeB 104 (FIG. 1). The physical layer circuitry 402 may also perform a handover from the serving cell 101 to the target cell 103 when the target cell RSRP 203 exceeds the serving cell RSRP 201 by at least the selected A3offset value for the selected TTT.

In some embodiments, the UE 400 may include one or more of a keyboard, a display, a non-volatile memory port, multiple antennas, a graphics processor, an application processor, speakers, and other mobile device elements. The display may be an LCD screen including a touch screen. The one or more antennas utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 400 may be configured with the instructions to perform the operations described herein.

In some embodiments, the processing circuitry 406 may include one or more processors and the physical layer circuitry 402 may include radio-frequency (RF) circuitry and baseband circuitry. The RF circuitry may include both receiver and transmitter circuitry. The receiver circuitry may convert received RF signals to baseband signals, and the baseband circuitry may convert the baseband signals to one or more bit streams. The transmitter circuitry may convert one or more bit streams to baseband signal and convert the baseband signals to RF signals for transmission.

In some embodiments, the UE 400 may be configured to receive OFDM communication signals over a multicarrier communication channel in accordance with an OFDMA communication technique. The OFDM signals may comprise a plurality of orthogonal subcarriers. In some broadband multicarrier embodiments, eNodeBs may be part of a broadband wireless access (BWA) network communication network, such as a 3rd Generation Partnership Project (3GPP) Universal Terrestrial Radio Access Network (UTRAN) Long-Term-Evolution (LTE) or a Long-Term-Evolution (LTE) communication network, although the scope of the embodiments is not limited in this respect. In these broadband multicarrier embodiments, the UE 400 and the eNodeBs may be configured to communicate in accordance with an orthogonal frequency division multiple access (OFDMA) technique for 3GPP-LTE.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRBs may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrums or a time-domain duplexing (TDD) technique that uses the same spectrum for uplink and downlink.

In some embodiments, the UE 400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE 400 and reported to the eNB. In some embodiments, the UE 400 may transmit a physical uplink control channel (PUCCH) of format 2, 2*a* or 2*b* containing the CQI/PMI or RI.

In these embodiments, the CQI may be an indication of the downlink mobile radio channel quality as experienced by the UE 400. The CQI allows the UE 400 to propose to an eNB an optimum modulation scheme and coding rate to use for a given radio link quality so that the resulting transport block error rate would not exceed a certain value, such as 10%. In some embodiments, the UE 400 may report a wideband CQI value which refers to the channel quality of the system bandwidth. The UE 400 may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs), transmit jointly. In these embodiments, the joint transmissions may be MIMO transmissions and the cooperating points are configured to perform joint beamforming.

FIG. 5 is a procedure for adaptive selection of handover initiation parameters in accordance with some embodiments. Procedure 500 may be performed by a UE, such as UE 102 (FIG. 1), for adaptive selection of handover initiation parameters.

In operation 502, the UE may measure a serving cell RSRP.

In operation 504, the UE may measure a target cell RSRP. Operation 504 may include measuring the RSRP of one or more neighbor cells as potential target cells and candidates for handover. The neighbor cell with the greatest RSRP may be the target cell.

In operation 506, the UE may select an A3offset value based on target cell RSRP. The A3offset value may be selected to be inversely related to the target cell RSRP.

In operation 508, the UE may select a TTT based on serving cell RSRP. The TTT may be selected to be directly related to the serving cell RSRP. The selection of an A3offset value and a TTT may be based on a comparison of the target cell RSRP to one or more RSRP thresholds and a comparison of the serving cell RSRP to one or more RSRP thresholds as previously described.

In operation 510, the UE may request a handover. In some embodiments, the UE may transmit a measurement report to an eNodeB for handover from the serving cell to the target cell when the target cell RSRP exceeds the serving cell RSRP by at least the A3offset value for the TTT. In some embodiments, the UE may transmit a handover request to the serving eNodeB.

In some embodiments, the UE may receive a plurality of A3offset values, a plurality of TTTs and the one or more RSRP thresholds from the eNodeB 104 (FIG. 1) at connection establishment. The selection of the A3offset value and the TTT may be made from the pluralities and may be based on the one or more RSRP thresholds.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by user equipment (UE) for adaptively selecting an A3offset-TTT pair for handover, the method comprising:
    selecting an A3offset value based on target cell reference signal received Power (RSRP);
    selecting a time-to-trigger (TTT) based on serving cell RSRP; and
    transmitting a measurement report to an eNodeB for handover from a serving cell to a target cell when the target cell RSRP exceeds the serving cell RSRP by at least the A3offset value of the TTT,
    wherein the A3offset value is selected to be inversely related to the target cell RSRP and the TTT is selected to be directly related to the serving cell RSRP,
    wherein selecting the A3offset value comprises selecting one of a plurality of A3offset values based on the target cell RSRP and one or more RSRP thresholds, and
    wherein selecting a TTT comprises selecting one of a plurality of TTTs based on the serving cell RSRP and the one or more RSRP thresholds.

2. The method of claim 1 further comprising:
    receiving the plurality of A3offset values, the plurality of TTTs and the one or more RSRP thresholds from the eNodeB at connection establishment; and
    storing the received A3offet values, TTTs and one or more RSRP thresholds in memory of the UE.

3. The method of claim 2 further comprising refraining from selecting or reselecting an A3offset value and TTT during an A3event, the A3event being when a measured target cell RSRP exceeds a measured serving cell RSRP by a currently selected A3offset value,
    wherein selection and reselection of an A3offset value and TTT of an A3offset-TTT pair are performed outside of the A3event.

4. The method of claim 2 wherein based on the one or more RSRP thresholds, greater A3offset values are selected for lower target cell RSRPs and lesser A3offset values are selected for higher target cell RSRPs, and
    wherein based on the one or more RSRP thresholds, greater TTTs are selected for higher serving cell RSRPs and lesser TTTS are Selected for lower serving cell RSRPs.

5. The method of claim 1 wherein:
    a first A3offset value is selected for the A3offset value when the target cell RSRP is greater than one of the RSRP thresholds;
    a Second A3offSet value is selected for the A3offset value when the target cell RSRP is not greater than one of the RSRP thresholds;
    a first TTT is selected to the TTT when the serving cell RSRP is greater than one of the RSRP thresholds; and
    a second TTT is selected for the TTT when the serving cell RSRP is not greater than one of the RSRP thresholds,
    wherein the first A3offset value is less than the second A3offset value, and the first TTT is greater than the second TTT.

6. The method of claim 1 wherein:
    a first A3offset value is selected for the A3offset value when the target cell RSRP is greater than a first of the RSRP thresholds,
    a second A3offset value is selected for the A3offset value when the target cell RSRP is greater than a second of the RSRP thresholds but is not greater than the first of the RSRP thresholds;
    a third A3offset value is selected for the A3offset value when the target cell RSRP is not greater than the second of the RSRP thresholds;
    a first TTT is selected for the TTT when the serving cell RSRP greater than the first of the RSRP thresholds;
    a second TTT is selected for the TTT when the serving cell RSRP greater than the second of the RSRP thresholds but is not greater than the first of the RSRP thresholds; and
    a third TTT is selected for the TTT when the serving cell RSRP is not greater than the second of the RSRP thresholds.

7. The method of claim 1 wherein the method further includes:
    setting a TTT timer in response to an A3event, the TTT timer to expire after the selected TTT, the A3event including when the target cell RSRP exceeds the serving cell RSRP by at least a currently selected A3offset value;
    stopping the TTT timer when the target cell RSRP does not exceed the serving cell RSRP by at least the selected A3offset value;
    sending the measurement report to the eNodeB upon expiration of the TTT timer.

8. A method of claim 1 wherein the target cell and the serving cell comprise different cell layers, the different cell layers comprising a macro-cell layer and a micro-cell layer the macro-cell layer comprising marco cells, the micro-cell layer comprising micro-cells, pico-cells and femto-cells.

9. A method performed by user equipment (UE) for adaptively selecting an A3offset-TTT pair for handover, the method comprising:
selecting an A3offset value based on target cell reference signal received Power (RSRP);
selecting a time-to-trigger (TTT) based on serving cell RSRP; and
transmitting a measurement report to an eNodeB for handover from a serving cell to a target cell when the target cell RSRP exceeds the serving cell RSRP by at least the A3offset value for the TTT,
wherein the A3offset value is selected to be inversely related to the target cell RSRP and the TTT is selected to be directly related to the serving cell RSRP, and
wherein the method further comprises:
measuring the target cell RSRP based on an average of downlink reference signals transmitted by a target cell eNodeB across a channel bandwidth; and
measuring the serving cell RSRP based on an average of downlink reference signals transmitted by a serving cell eNodeB across the channel bandwidth,
wherein the A3offset value and the TTT of the A3offset-TTT pair are selected based on the measured RSRPs.

10. User equipment (UE) comprising:
processing circuitry to select an A3offset value based on a measured target cell reference signal received power (RSRP) and to select a time-to-trigger (TTT) based on a measured serving cell RSRP; and
physical layer circuitry to transmit a measurement report from a serving cell to a target cell when the target cell RSRP exceeds the serving cell RSRP by at least the A3offset value for the TTT,
wherein the A3offset value is selected to be inversely related the target cell RSRP and the TTT is selected to be directly related to the serving cell RSRP,
wherein the physical layer of circuitry is arranged to:
receive a plurality of A3offset values, a plurality of TTTs and one or more RSRP thresholds from an eNodeB at connection establishment; and
monitor the serving cell RSRP and the target cell RSRP,
wherein the processing circuitry is to select the A3offset value from the plurality of A3offset values based on the target cell RSRP and select the TTT from the plurality of TTTs based on the serving cell RSRP.

11. The UE of claim 10 wherein the processing circuitry is arranged to:
refrain from selecting or reselecting an A3offset value and TTT during an A3event, the A3event being when a measured target cell RSRP exceeds a measured serving cell RSRP by a currently selected A3offset value,
wherein selection and reselection of an A3offset value and TTT of an A3offset-TTT pair are performed outside of the A3event.

12. The UE of claim 11 wherein greater A3offset values are selected for lower target cell RSRPs and lesser A3offset values are selected for higher target cell RSRPs, and
wherein greater TTTs are selected for higher serving cell RSRPs and lesser TTTs are selected for lower serving cell RSRPs.

13. User equipment (UE) for operating in a wireless access network, the UE comprising:
physical layer circuitry to communicate with an enhanced node B (eNodeB) using two or more antennas in accordance with an orthogonal frequency division multiple access (OFDMA) technique, the physical layer circuitry to receive a plurality of A3offset values, a plurality of time-to-triggers (TTTs) and one of more reference signal received power (RSRP) thresholds from the eNodeB at connection establishment, the physical layer circuitry to measure RSRP of a target cell and a serving cell; and
processing circuitry to select one of the A3offset values based on the measured RSRP of the target cell and the one or more RSRP thresholds, and to select one of the TTTs based on the measured RSRP of the serving cell and the one or more RSRP thresholds.

14. The UE of claim 13 wherein the processing circuitry is arranged to transmit a measurement report to the eNodeB for handover initiation when the target cell RSRP exceeds the serving cell RSRP by at least the selected A3offset value selected TTT.

15. The UE of claim 14 wherein a greater A3offset value is selected for a lower target cell RSRP and a lesser A3offset value is selected for a higher target cell RSRP, and
wherein a greater TTT is selected for higher serving cell RSRPs and a lesser TTT is selected for lower serving cell RSRPs.

16. The UE of claim 15 wherein the processing circuitry is arranged to refrain from selecting or reselecting an A3offset value TTT during an A3event, the A3event being when the measured target cell RSRP exceeds the measured serving cell RSRP by a currently selected A3offset value,
wherein selection and reselection of an A3offset value and TTT of an A3offset-TTT pair are performed outside of the A3event.

17. A. method for handover comprising:
receiving a plurality of A3offset values, a plurality of time-to-triggers (TTTs) and one or more reference signal received power (RSRP) thresholds from an enhanced node B (eNodeB) at connection establishment;
measuring an RSRP of a target cell and an RSRP of a serving cell;
selecting one of the A3offset values based on the measured RSRP of the target cell and one or more RSRP thresholds, the A3offset value selected to be inversely related to the target cell RSRP; and
selecting one of the TTTs based on the measured RSRP of the serving cell and the one or more RSRP thresholds, the TTT selected to be directly related to the serving cell RSRP.

18. The method of claim 17 further comprising:
reselecting an A3offset value and a TTT from the pluralities as the serving cell and target cell RSRPs change; and
refraining from selecting or reselecting an A3offset value and a TTT during an A3event.

19. The method of claim 18 wherein the A3event includes a time when the measured target cell RSRP exceeds the measured serving cell RSRP by a currently selected A3offset value, and
wherein the method includes initiating handover from the serving cell to the target cell when the target cell RSRP exceeds the serving cell RSRP by at least the selected A3offset value for the selected TTT.

* * * * *

UNITED STATES PATENT AND TRADEMARK OFFICE
CERTIFICATE OF CORRECTION

PATENT NO. : 8,818,376 B2  
APPLICATION NO. : 13/569443  
DATED : August 26, 2014  
INVENTOR(S) : Yiu et al.

Page 1 of 1

It is certified that error appears in the above-identified patent and that said Letters Patent is hereby corrected as shown below:

In the Claims,

In column 10, line 5, in Claim 2, delete "A3offet" and insert --A3offset--, therefor In column 10, line 16, in Claim 4, delete "threshods" and insert --thresholds--, therefor In column 10, line 22, in Claim 4, delete "ITTS are Selected" and insert --ITTs are selected--, therefor In column 10, line 27, in Claim 5, delete "Second A3offSet" and insert --second A3offset--, therefor In column 10, line 30, in Claim 5, delete "to" and insert --for--, therefor In column 10, line 40, in Claim 6, delete "thresholds," and insert --thresholds;--, therefor In column 10, line 49, in Claim 6, after "RSRP", insert --is--, therefor In column 10, line 51, in Claim 6, after "RSRP", insert --is--, therefor In column 11, line 1, in Claim 8, delete "A" and insert --The--, therefor In column 11, line 3, in Claim 8, after "layer", insert --,--, therefor In column 11, line 4, in Claim 8, delete "marco" and insert --micro--, therefor In column 11, line 41, in Claim 10, after "layer", delete "of", therefor In column 12, line 11, in Claim 13, after "measure", insert --an--, therefor In column 12, line 21, in Claim 14, before "selected", insert --for the--, therefor In column 12, line 30, in Claim 16, after "value", insert --and--, therefor In column 12, line 36, in Claim 17, delete "A." and insert --A--, therefor Signed and Sealed this  
Second Day of December, 2014

Michelle K. Lee  
*Deputy Director of the United States Patent and Trademark Office*